(12) United States Patent
Delisle et al.

(10) Patent No.: US 6,701,043 B2
(45) Date of Patent: Mar. 2, 2004

(54) ARRAYED WAVEGUIDE GRATING HAVING A REFLECTIVE INPUT COUPLING

(75) Inventors: Vincent Delisle, Ottawa (CA); Steven David Oliver, Ottawa (CA); Alan J. P. Hnatiw, Stittsville (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/836,459

(22) Filed: Apr. 18, 2001

(65) Prior Publication Data

US 2001/0033715 A1 Oct. 25, 2001

Related U.S. Application Data

(60) Provisional application No. 60/198,573, filed on Apr. 20, 2000.

(51) Int. Cl.$^7$ ............................................. G02B 6/34
(52) U.S. Cl. ........................... 385/37; 385/14; 385/33; 385/129
(58) Field of Search .................... 385/37, 31, 47, 385/33, 129, 24, 130, 131, 34, 14; 359/124, 115, 127, 130, 131; 398/84

(56) References Cited

U.S. PATENT DOCUMENTS

| 5,732,171 | A | | 3/1998 | Michel et al. ................ 385/27 |
| 5,905,824 | A | | 5/1999 | Delisle et al. ................ 385/15 |
| 5,920,663 | A | | 7/1999 | Dragone ....................... 385/15 |
| 6,011,885 | A | | 1/2000 | Dempewolf et al. .......... 385/34 |
| 6,069,990 | A | * | 5/2000 | Okawa et al. ................ 359/115 |
| 6,243,514 | B1 | * | 6/2001 | Thompson ................... 385/14 |
| 2001/0033714 | A1 | * | 10/2001 | Delisle et al. ................ 385/33 |

FOREIGN PATENT DOCUMENTS

| JP | 11326975 | 11/1999 | ............. G02F/2/00 |
| JP | 2000098148 | 7/2000 | ............. G02B/6/12 |

OTHER PUBLICATIONS

"Optical Phased Array Filter Module with Passively Compensated Temperature Dependence" Heise et al., ECOC, Sep. 1998, Madrid, Spain pp. 319–320.

* cited by examiner

Primary Examiner—Audrey Chang
Assistant Examiner—Denise S. Allen
(74) Attorney, Agent, or Firm—Teitelbaum & MacLean; Neil Teitelbaum; Doug MacLean

(57) ABSTRACT

The present invention relates to an arrayed waveguide grating having a reflective input that permits variable coupling to adjust the center wavelength. The present invention has found that by providing an arrayed waveguide grating having one or more precisely positioned input waveguides coupled through a reflective lens assembly, for providing a lateral offset to a signal propagating from the input waveguide to the planar waveguide, and for focusing a reflected input signal at a selected input point of the input planar waveguide, alignment and tuning of an input and assembly can be improved and simplified. Advantageously, variable coupling parameters can be incorporated into the reflective coupling including input position, waveguide taper and planar waveguide length increment to provide relatively simple tuning in an integrated device. Compensation for polarization effects and thermal effects can also be provided in the reflective coupling.

21 Claims, 6 Drawing Sheets

ARRAYED WAVEGUIDE GRATING HAVING A REFLECTIVE INPUT COUPLING

This application claims priority from U.S. Provisional Patent Application No. 60/198,573 filed Apr. 20, 2000.

FIELD OF THE INVENTION

The present invention relates to an arrayed waveguide grating having a reflective input, and particularly a reflective input that permits variable coupling to adjust the center wavelength.

BACKGROUND OF THE INVENTION

An arrayed waveguide grating (AWG) is a dispersive optical device used for multiplexing or demultiplexing a set of optical telecommunications channels having different wavelengths. An example of an AWG is shown in FIG. 1. The AWG 100 is an integrated optics device formed on a substrate. The AWG has at least one input waveguide 10 for launching a multiplexed signal comprising a plurality of wavelength channels, $\lambda 1$ to $\lambda n$, into a free-space slab such as a star coupler 12. The star coupler 12 distributes a wavefront of the signal evenly to a plurality of waveguides that form the grating 14. Each of the plurality of waveguides has a different optical length, the optical lengths of adjacent waveguides differing by a constant value and increasing geometrically from one side of the grating to the other. Interference caused by the relative phase differences introduced by the grating 14 occurs in a second free-space slab such as a star coupler 16. The dispersion of the grating 14 physically separates the different wavelengths and focuses the dispersed light on an output plane 17 of the second star coupler, where separated wavelengths are coupled into a plurality of output waveguides 18. A center wavelength of a selected channel is located at a selected output waveguide 18 for optimized coupling. The center wavelength and the spacing of the individual wavelength channels are determined by the geometry of the AWG layout and by the effective refractive index of the waveguides of the grating. The output waveguides 18 determine the bandwidth of the individual channels by their width. Operated in a reverse direction, multiple signals of different wavelengths are launched from the plurality of waveguides 18 and pass through the grating 14 to interfere in the star coupler 12, and be combined as a multiplexed signal into a single waveguide 10.

The position of the input waveguide 10 at the input plane 20 of the star coupler 12, from which a multiplexed signal is launched, affects the location of the focused output signals. Input waveguides have been included as a part of the integrated device. However, manufacturing tolerances are not tight enough to accurately set the center wavelength in manufacture for narrow channel spacing. The index accuracy achieved with the many deposition techniques used to make AWGs is not sufficient to set the central wavelength within the required tolerances.

In U.S. Pat. No. 5,732,171, assigned to Siemens Aktiengesellschaft, Michel et al. disclose placing the input plane of the star coupler at the edge of the substrate in which the device is formed to permit coupling a waveguide at a selected location after manufacture. Tuning may be performed to align the center wavelength of the channels of the multiplexed signal with their respective output ports to optimize coupling.

Tuning by affixing a fiber pigtail is subject to alignment error over 5 degrees of freedom. With reference to FIG. 1, X-Y-Z coordinates are shown. The X axis indicates lateral movement along the input plane 13 of the star coupler 12, which affects the center wavelength alignment. The Y axis indicates vertical movement with the planar slab, which is generally single mode in the vertical direction. Consequently fine alignment is necessary to reduce coupling losses. The Z axis indicates movement in and out from the input plane 13 of the star coupler 12. Alignment in this axis affects the pitch, or separation of the focused channel outputs on the output plane 17 of the second star coupler 16. In addition $\theta X$ and $\theta Y$ indicate rotational tilt about the X and Y axes, which will further affect tuning of the center wavelength and insertion loss.

A different approach to setting the center wavelength of an arrayed waveguide grating is disclosed in U.S. Pat. No. 5,290,663, assigned to Lucent Technologies Inc., by Dragone. This patent teaches deformation of the grating in order to control either of its ambient temperature dependence or its transmission characteristics. The deformation is designed to stretch or compress the optical lengths of the grating arms. Such changes give rise to birefringence effects that produce different propagation constants for the TE and TM waveguide modes. For temperature compensation the deformation of the grating serves to maintain the difference in successive arms of the grating in the same relative proportions despite changes in the ambient temperature. Such deformation also provides some tuning of the transmission characteristics of the router to correct for departures from the design characteristics or manufacturing aberrations. However, the birefringent effects increase polarization dependent loss and polarization mode dispersion.

It is desired to provide an improved coupling into an arrayed waveguide grating which would simplify the assembly and permit variable tuning to adjust the center wavelength.

It is further desired to provide an arrayed waveguide having an integrated variable input waveguides to provide tuning flexibility.

SUMMARY OF THE INVENTION

The present invention has found that by providing an arrayed waveguide grating having one or more precisely positioned input waveguides coupled through a reflective lens assembly, for providing a lateral offset to a signal propagating from the input waveguide to the planar waveguide, and for focusing a reflected input signal at a selected input point of the input planar waveguide, alignment and tuning of an input and assembly can be improved and simplified.

Accordingly, the present invention provides an arrayed waveguide grating comprising:

a substrate for supporting an integrated arrayed waveguide grating formed therein including:

an input planar waveguide, having an input plane at an edge of the substrate and an output plane, for propagating a wavefront from an input point on the input plane to an output plane;

a grating comprising an array of waveguides optically coupled to the output plane of the input planar waveguide for receiving the wavefront, an optical length of the waveguides differing by a substantially equal amount from a first waveguide to an nth waveguide; and, an output planar waveguide for focusing separated wavelength signals on an output plane of the output planar waveguide for coupling to output waveguides; and an input assembly for launching a signal into the integrated arrayed waveguide grating including:

at least one input waveguide disposed on a plane substantially parallel to the input planar waveguide having a waveguide end for launching a signal into the input planar waveguide;

a lens assembly including a lens means symmetrically disposed between the coupled input point and the waveguide end of a selected one of the at least one waveguide, and a reflective element optically coupled to the lens, the lens assembly for providing a lateral offset to a signal propagating from the input waveguide to the planar waveguide, and for focusing a reflected input signal at the input point of the input planar waveguide.

Advantageously, variable coupling parameters can be incorporated into the reflective coupling including input position, waveguide taper and planar waveguide length increment to provide relatively simple tuning in an integrated device.

BRIEF DESCRIPTION OF THE DRAWINGS

Further advantages will be clear to persons skilled in the art with reference to the following drawings showing exemplary embodiments of the invention in which:

FIG. 6b is a detailed schematic illustration of a birefringence module incorporated in FIG. 6a;

DETAILED DESCRIPTION OF PREFERRED EMBODIMENTS

Figure 1:
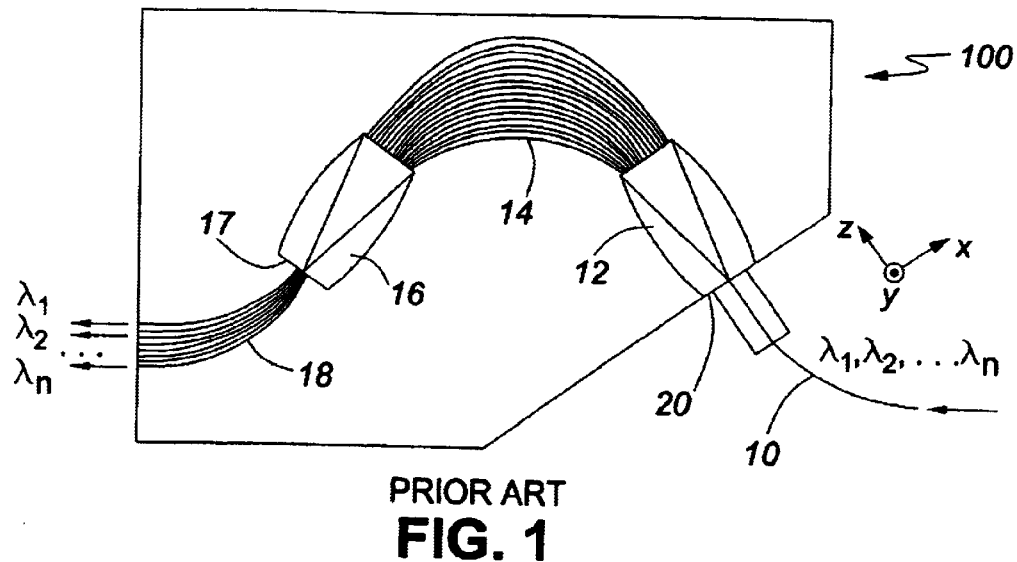
FIG. 1 is a schematic illustration of a prior art AWG having an input waveguide in the form of a fiber pigtail coupled directly to an edge of the substrate.
Figure 2:
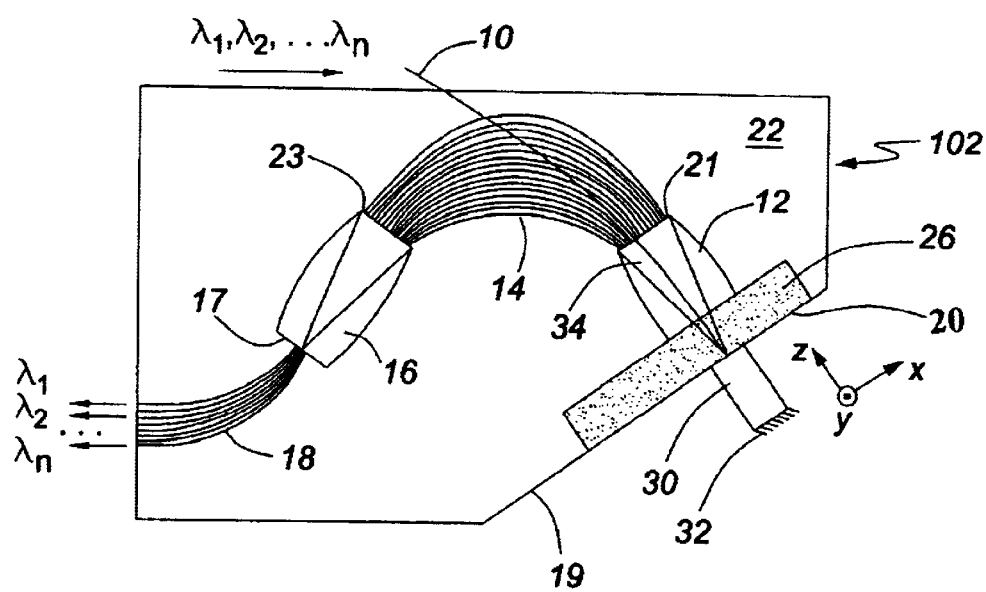
FIG. 2 is a schematic illustration of an AWG in accordance with the present invention including an optical fiber input reflectively coupled to the edge of the substrate.

FIG. 2 shows an AWG 102 in accordance with the present invention including an input planar waveguide 12 also termed a slab, a grating of arrayed waveguides 14 and an output planar waveguide 16. The input planar waveguide 12 has an input plane 20 located at an edge 19 of the substrate 22 in which the integrated optical device is formed, and an output plane 21 optically coupled to the arrayed waveguides 14. Light from the waveguides 14 is coupled into the input plane 23 of the output planar waveguide 16. The output planar waveguide 16 is coupled to a plurality of output waveguides 18 at an output plane 17.

Light, comprising an optical signal including a plurality of wavelength channels, is launched into an input waveguide 10. The input waveguide 10 is supported above the substrate 22 in which the integrated device is formed, by a glass block 26. The glass block 26 is positioned above the surface of the planar waveguide 12, and has a front face, which is coplanar with the input plane 20. An end portion of the fiber 10 is positioned in a V-groove which aligns the fiber output perpendicular to the input plane 20 and parallel to the plane of the planar waveguide with the fiber end face substantially aligned with the front face of the block 26. The fiber 10 is coupled to the input plane 20 of the input planar waveguide 12 at an input point selected to provide a maximum intensity of a desired center wavelength aligned for coupling to a selected output waveguide 18.

Coupling in accordance with the present invention is provided through a lens assembly including a lens 30 and a reflective element 32, such as a mirror coating formed on the end face of the lens 30. The lens 30 is positioned at the input plane with the axis of the lens disposed symmetrically between the fiber end face and the input point. Light from the fiber 10 is launched into the lens 30 off axis, is reflected by the mirror 32, and is focused at the input plane 20 off axis by a symmetrical amount. The lens assembly provides a lateral shift from the fiber 10 to the input point. The focal length of the lens 30 can also be adjusted to vary the focus and accordingly the input point. For instance, a graded index lens may be foreshortened to accommodate an adhesive thickness between the lens 30 and the input plane 20, or to reduce the pitch of the dispersed channels. Pitch as used throughout this document refers to the amount of spatial separation between center wavelengths of the channels on the output plane 17.

The light from the input point propagates through the input planar waveguide 12 as a wavefront forming a diverging cone 34, confined in a vertical dimension, from the input point to the output plane 21 for coupling to the array of waveguides 14. Light from the waveguide array 14 is coupled into the input plane 23 of the output planar waveguide 16, where interference among the signals is resolved as separated wavelength spots focused on the output plane 17. The wavelength spots having a center wavelength for each channel are aligned with and coupled to the output waveguides 18.

In order to align the center wavelengths of the channels to the output waveguides 18, the input waveguide 10 must be coupled to a precise input point. Through manufacturing tolerances, this point will vary from device to device. By coupling light into the device 102 through the input assembly including the input waveguide 10 and the lens assembly 30,32, two of the five degrees of freedom are eliminated. The plane of the input waveguide 10 is fixed by the plane of the block 26, which removes the ΘX. The perpendicular orientation of the waveguide end is also fixed by the V-groove in the block 26, eliminating the ΘY. As mentioned above, adjustments to the lens length can provide a higher degree of positioning accuracy in the Z axis. Reducing the positioning to a simpler X-Y alignment operation. Adjustment in the X axis determines the center wavelength position. Adjustment in the Y axis affects coupling efficiency.

Figure 3:
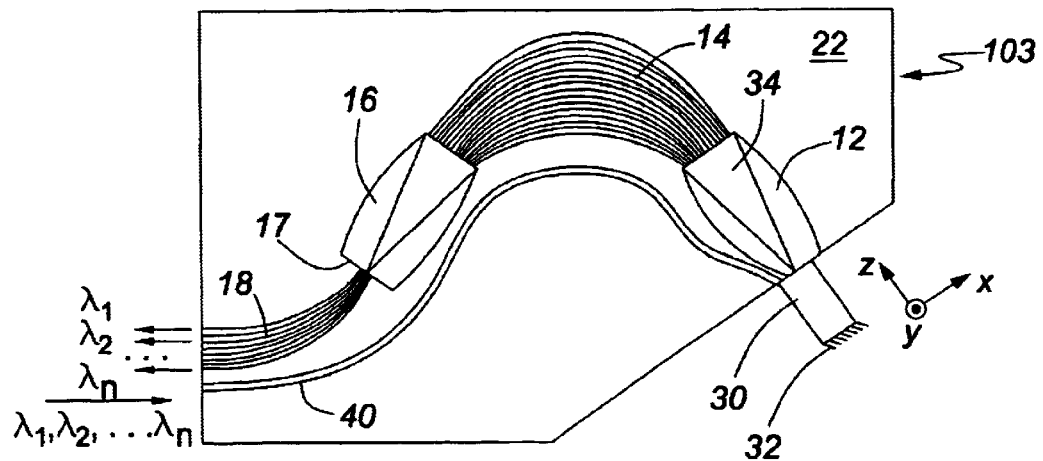
FIG. 3 is a schematic illustration of an AWG in accordance with an alternative embodiment of the present invention including an integrated input waveguide and a reflective input coupling.

A further embodiment of the invention 103, shown in FIG. 3 reduces the range of X-Y displacement necessary to tune the AWG. In this embodiment, the input waveguide comprises one or more integrated waveguides 40 formed in the substrate with the AWG itself. In order to position the waveguide ends of the input waveguides 40 close to the input point, the planar waveguide 12 is reduced to its minimal dimensions to accommodate the input waveguides 40. The cone 34 of the propagating wavefront defines the minimal dimensions, and input waveguides 40 can be positioned on one side or both of the cone 34 beside the modified planar waveguide 12. In this arrangement θX is fixed by the plane of the waveguide in the substrate and θY is fixed by the design of the photomask. It is preferred to launch an input signal from an integrated waveguide over fiber, because the mode field width of the integrated waveguide is well defined, providing more accurate control of the bandwidth of the device. Fiber has a mode field width accuracy of only ±10%. In the past it has been necessary to use fiber as an input waveguide to facilitate tuning. This invention facilitates a design which is more compact, and easier to assemble, as the polishing and pigtailing of fibers, all at one substrate edge, can be done at the same time.

Figure 4:
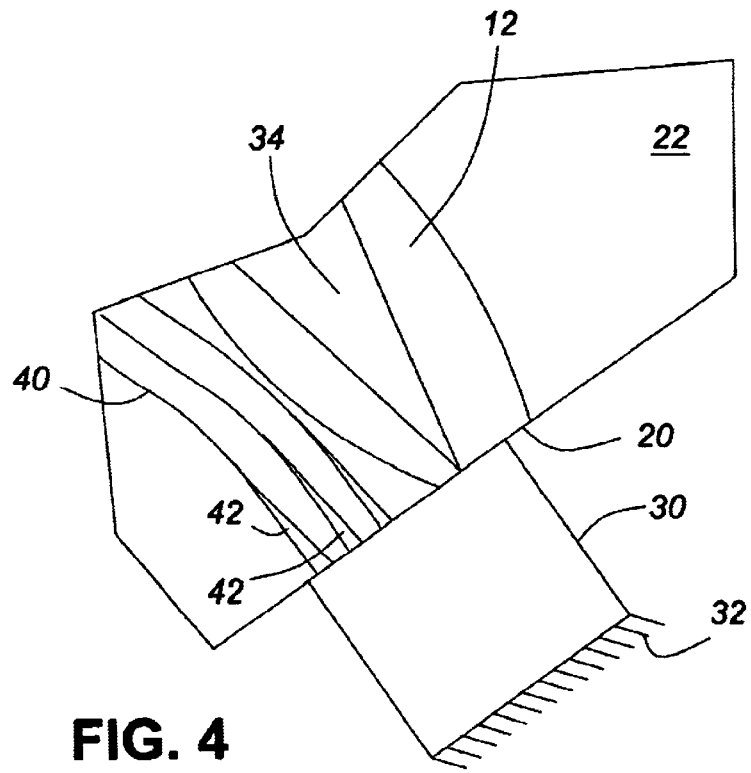
FIG. 4 is a schematic illustration of a further embodiment of the reflective coupling in accordance with the present invention.
Figure 5:
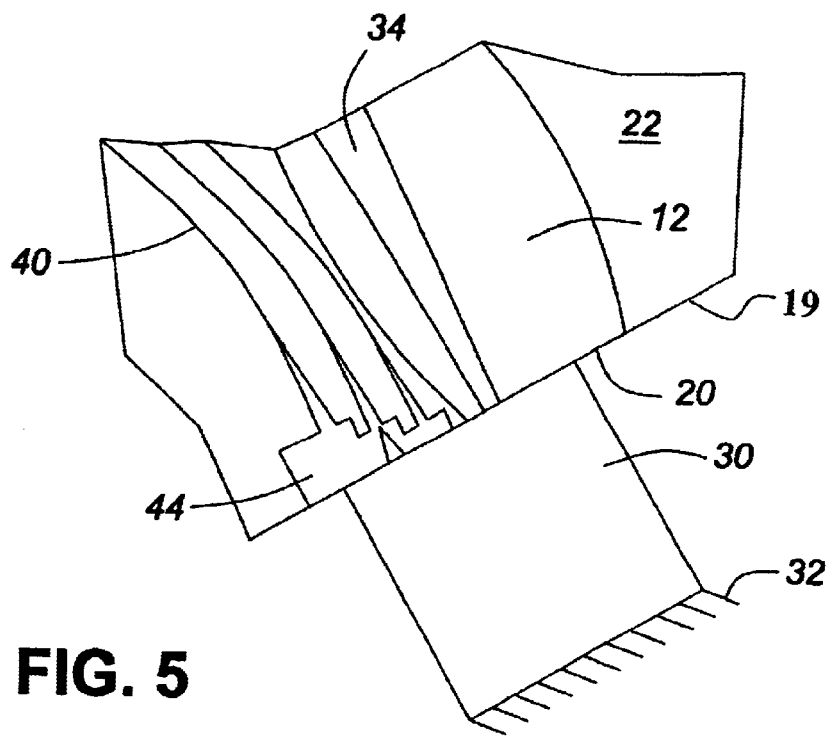
FIG. 5 is a schematic illustration of a still further embodiment of the reflective coupling.

As shown in FIGS. 4 and 5, the invention, when implemented with integrated input waveguides permits the integration of many different inputs with varying parameters. It is then possible to select the best input waveguide by moving the lens assembly in the X direction. One of the parameters that can be varied is the width at the end of the waveguide inputs by tapering the waveguide ends 42, as shown in FIG. 4. The taper 42 provides additional control or variation to the mode field width, and the resulting bandwidth of the device. By providing a plurality of input waveguides with different taper dimensions, a best input can be selected by positioning the lens assembly symmetrically between the selected waveguide 40 and the selected input point.

A further parameter to vary the input characteristics is shown in FIG. 5. The length of the slab or planar waveguide 12 can be adjusted by incorporating slab or planar waveguide length increments 44 onto the input waveguides 40. Different slab increments 44 are shown with stepped lengths from the substrate edge 19. The wavefront cone 34 in the planar waveguide 12 is no longer a point source at the input plane 20, since the diverging wavefront begins at the slab increment 44. This provides selective adjustment in the Z axis. By increasing the slab increment 44, the pitch is increased. In this way it is possible to fix an exact channel pitch without introducing excess losses. The polishing tolerance is also reduced, since for the same polishing position, one can select many different slab lengths.

These parameters of waveguide position, taper dimension and slab increment can be combined and varied among a plurality of input waveguides to provide flexibility in tuning an AWG device.

Figure 6A:
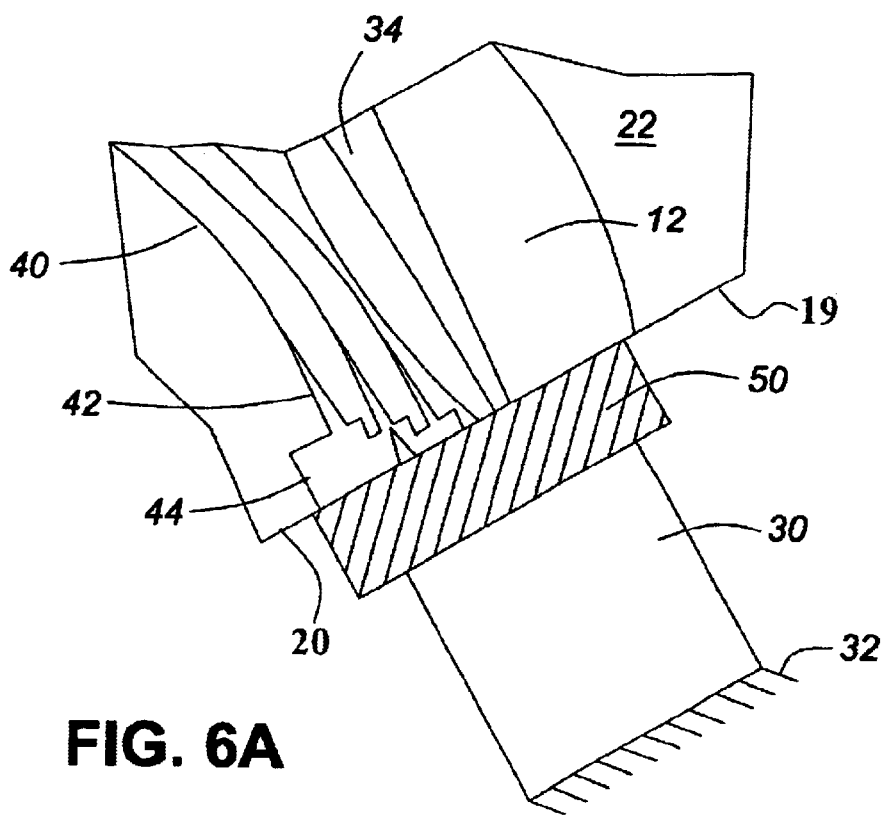
FIG. 6a is a schematic illustration of the reflective coupling of FIG. 5 in combination with a birefringence module.

A reflective input assembly in accordance with the present invention is compatible with incorporating a birefringence module 50 at the input plane 20 as shown in FIG. 6a. The birefringence module 50 provides compensation for polarization effects within the AWG, including polarization dependent wavelength, polarization mode dispersion, and in the embodiment shown in FIG. 6c, polarization dependent loss. More detailed discussion of the birefringence module 50 can be found in the copending U.S. patent application Ser. No. 09/836,465, filed Apr. 18, 2001, published Nov. 1, 2001 with publication No. 2001/0036330, assigned to a common owner, herein incorporated by reference.

Figure 6B:
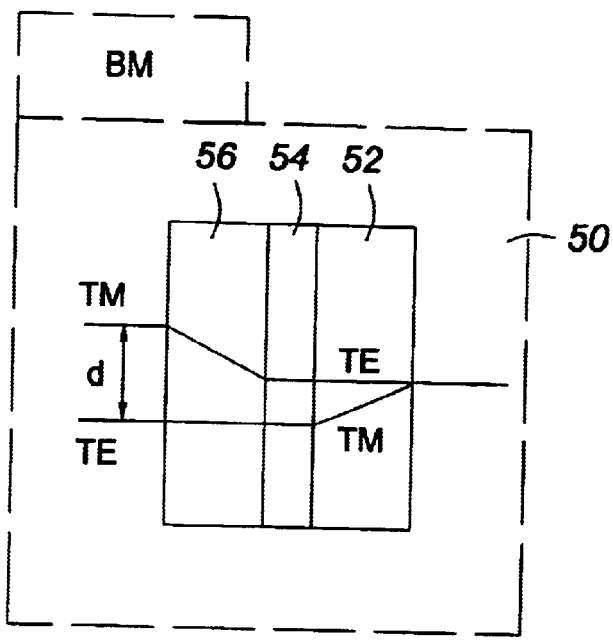

FIG. 6b shows a birefringence module 50, including a first birefringent element 52 a halfwave plate 54 and a second birefringent element 56, in which the optical path lengths of the TE and TM polarization states are substantially equal. By changing the axes of the birefringent elements 52,56 the half-wave plate can be omitted. The thickness and axis orientation of each crystal 52,56 is chosen to give a total polarization offset of a desired distance d, and to create a time delay between the two polarizations of an opposite value to the delay caused by the AWG. Thus, by altering the design from substantially equal optical path lengths, the birefringence module 50 can provide compensation for polarization mode dispersion and polarization dependent wavelength.

Figure 6C:
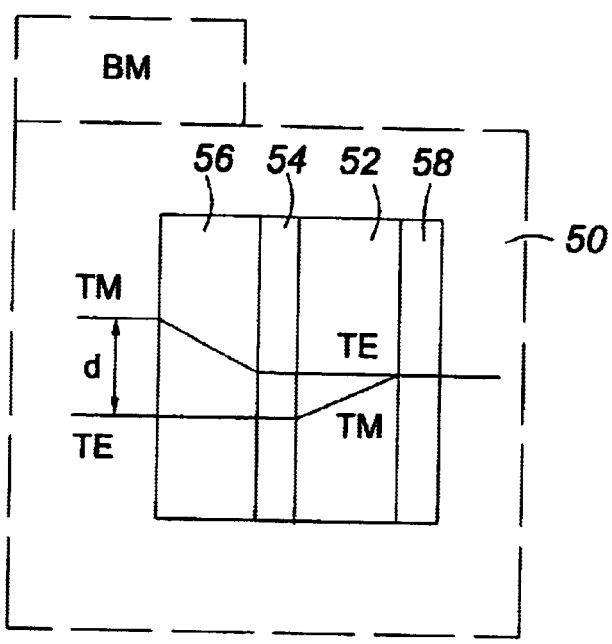
FIG. 6c shows a detailed schematic illustration of an alternative birefringence module including a polarizer at the end face of the module.

FIG. 6c shows an alternative embodiment of the birefringence module 50' including a polarizer 58 at the end face of the module 50' where the beams are combined. The polarizer 58 is selected to have an extinction ratio between the two polarization states to compensate for polarization dependent loss in the AWG. Thus, if the intensity of light of the two polarization states is not equal after passing through the AWG, a polarizer 58 can be selected to absorb a portion of the less attenuated polarization state at the output of the birefringence module 50'.

Figure 7:
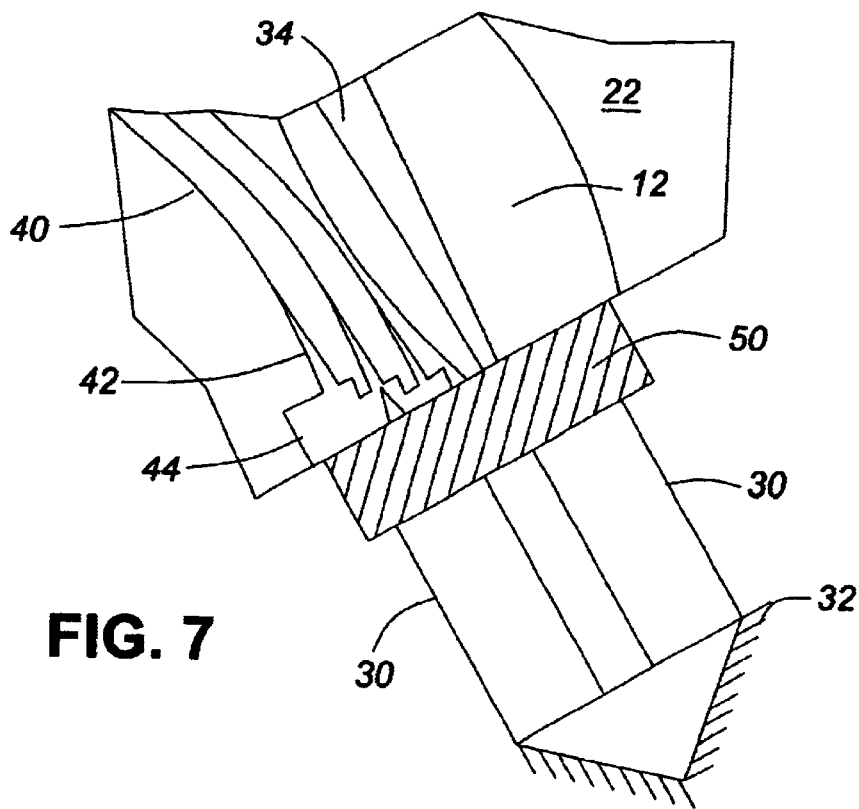
FIG. 7 is a schematic illustration of an alternative embodiment in accordance with the present invention.
Figure 8A:
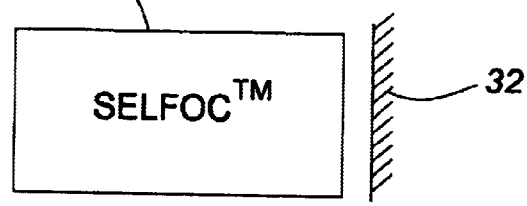
FIGS. 8a–c are schematic illustrations of example lens assemblies for use in the present invention; and, FIGS. 9a and b illustrate alternative embodiments of an athermal reflective coupling.
Figure 8B:
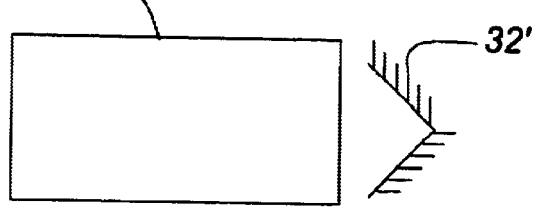
Figure 8C:
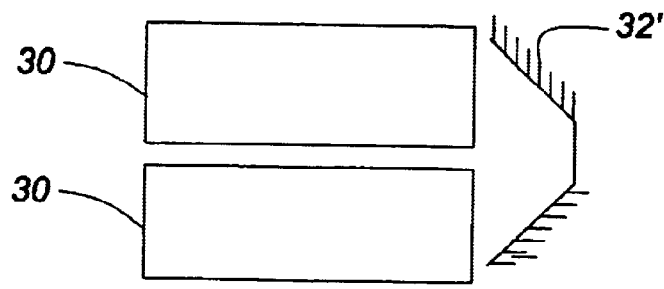

For some AWG designs, the distance between the inputs 40 and the input point at the middle of the planar waveguide 12 will be too large for a graded index lens. In order to increase the offset, the lens assembly is modified to include two lenses 30 and a corner mirror 32', as shown in FIGS. 7 and 8c. FIGS. 8a and 8b illustrate alternative lens assemblies.

Despite initial tuning, changes in temperature can cause the center wavelength of an AWG to shift because the refractive index of the phased array changes in response to temperature. This causes the position of the phase front leaving the device to shift. As a result, incomplete channel coupling occurs at the output waveguides. The reflective coupling in accordance with the present invention can incorporate additional thermal compensation.

Figure 9A:
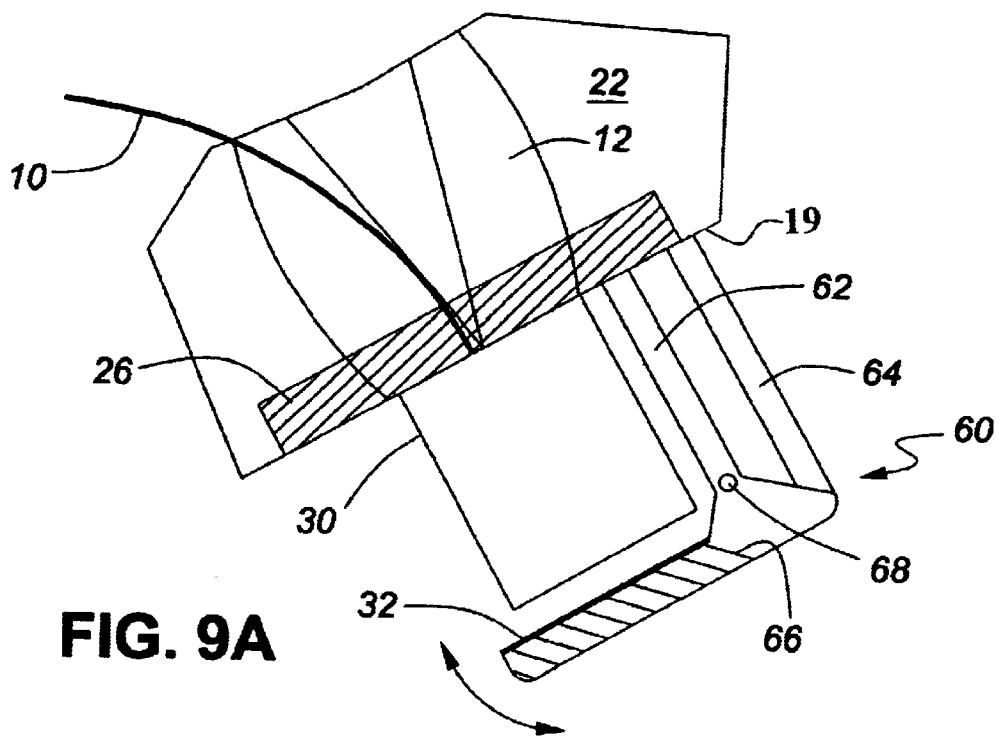
Figure 9B:
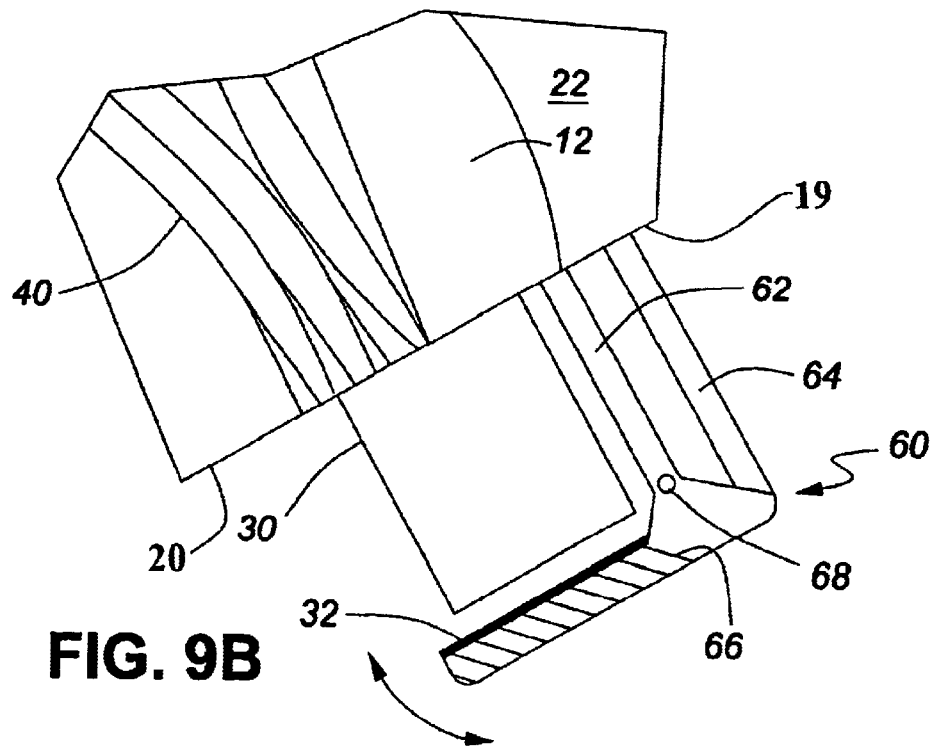

FIG. 9a and b illustrate an athermal reflective coupling 60 comprising a thermally actuated pivot mechanism for supporting the mirror 32. The athermal coupling 60 includes a first arm 62 of a material having a first coefficient of thermal expansion and a second arm 64 of a different material having a second coefficient of thermal expansion. Each arm 62,64 abuts the substrate edge 19, or another common reference plane. The first arm 62 supports a mirror frame 66 which is coupled to the second arm 64 at one side, and which carries the mirror 32 on another side of the first arm 62. A flex or pivot point 68 at the first arm 62 forms a rotation center 68 about which the mirror frame 66 pivots in response to differential expansion of the first and second arms 62,64. Light hits the mirror 32 as a collimated beam from the lens 30. The collimated beam is reflected back into the lens 30 at an angle determined by the pivot of the athermal coupling 60. The angle is translated by the lens 30 as an offset, thus shifting the input point at the input plane 20. Of course, materials of different coefficients of expansion can be used to introduce a tilt to the mirror 32 in many configurations that will be apparent to the person skilled in the art. The athermal input apparatus is discussed in greater detail in copending U.S. patent application Ser. No. 09/838,137 filed Apr. 20, 2001, published Oct. 25, 2001 with publication No. 2001/0033714, assigned to a common owner, herein incorporated by reference.

Numerous other embodiments can be envisaged without departing from the spirit and scope of the invention, which is defined in the claims.

What is claimed is:

1. An arrayed waveguide grating for spatially separating an optical signal including a plurality of wavelength channels comprising:
   a substrate for supporting an integrated arrayed waveguide grating formed therein including:
      an input planar waveguide, having an input plane at an edge of the substrate and an output plane, for propagating a wavefront from an input point on the input plane to an output plane;
      a grating comprising an array of waveguides optically coupled to the output plane of the input planar waveguide for receiving the wavefront, an optical length of the waveguides differing by a substantially equal amount from a first waveguide to an nth waveguide; and,
      an output planar waveguide for focusing separated wavelength signals on an output plane of the output planar waveguide for coupling to output waveguides; and
   an input assembly for launching a signal into the integrated arrayed waveguide grating including:
      at least one input waveguide disposed on a plane substantially parallel to the input planar waveguide having a waveguide end for launching a signal into the input point on the input planar waveguide; and
      a lens assembly including lens means symmetrically disposed between the coupled input point and the waveguide end of a selected one of the at least one input waveguide, and a reflective element optically coupled to the lens means, the lens assembly for providing a lateral offset to a signal propagating from the input waveguide to the input planar waveguide, and for focusing a reflected input signal at the input point of the input planar waveguide.

2. An arrayed waveguide grating as defined in claim 1, wherein the at least one input waveguide comprises at least one integrated waveguide formed in the substrate with the integrated arrayed waveguide grating.

3. An arrayed waveguide grating as defined in claim 2, wherein the at least one input waveguide has an output end coplanar with the input plane and adjacent to the input point on the input planar waveguide.

4. An arrayed waveguide grating as defined in claim 2, wherein the at least one input waveguide comprises a plurality of input waveguides each a selected different distance from the input planar waveguide to provide selective adjustment of a central wavelength response of the device.

5. An arrayed waveguide grating as defined in claim 2, wherein an end portion of the at least one input waveguide has an increasing tapered width.

6. An arrayed waveguide grating as defined in claim 4, wherein each one of the plurality of input waveguides has an end portion having an increasing tapered width.

7. An arrayed waveguide grating as defined in claim 6, wherein each of the tapered widths is different among the plurality of input waveguides.

8. An arrayed waveguide grating as defined in claim 5, wherein one of the input waveguides includes a planar waveguide portion between the waveguide end thereof and the lens means.

9. An arrayed waveguide grating as defined in claim 7, wherein the plurality of input waveguides include planar waveguide portions of different lengths between the waveguide ends and the lens means.

10. An arrayed waveguide grating as defined in claim 1, wherein the lens assembly comprises:
   a pair of matched lenses symmetrically disposed between the coupled input point and the waveguide end of a selected one of the at least one waveguide, and
   a corner mirror for providing a larger lateral offset for a signal propagating between the selected input waveguide end and the input point.

11. An arrayed waveguide grating for spatially separating an optical signal including a plurality of wavelength channels comprising:
   at least one input waveguide having an end face for launching an optical signal;
   a first planar waveguide having an input plane coplanar with the end face of the at least one input waveguide, for propagating light from an input point on the input plane as a diverging wavefront;
   lens means having a focal plane substantially at the coplanar end faces of the at least one input waveguide and of the first planar waveguide, and a reflective element for reflecting light from the at least one input waveguide to focus at the input point of the first planar waveguide;
   a grating optically coupled to receive the diverging wavefront comprising an array of waveguides for providing an optical phase shift;
   a second planar waveguide optically coupled to receive the light having an optical phase shift for focusing spatially separated wavelengths at an output plane;
   a plurality of output waveguides for optically coupling the spatially separated wavelengths corresponding to wavelength channels,
   wherein the lens means is positioned to focus light from the input waveguide end face at an input point selected to provide a center wavelength aligned with a selected output waveguide.

12. An arrayed waveguide as defined in claim 11, combining a plurality of wavelength channels, wherein the plurality of output waveguides are provided for launching the plurality of wavelength channels; and wherein the at least one input waveguide is provided for outputting a combined optical signal.

13. An arrayed waveguide grating as defined in claim 11, wherein the lens means comprises a lens having an optical axis symmetrically disposed between the coupled input point and the end face of a selected one of the at least one input waveguide.

14. An arrayed waveguide grating as defined in claim 11, wherein the lens means comprises at least one quarter-pitch graded index lens having a focal plane aligned with the input plane of the planar waveguide.

15. Any arrayed waveguide grating as defined in claim 11, wherein the at least one input waveguide comprises an integrated waveguide.

16. An arrayed waveguide grating as defined in claim 15, wherein the input planar waveguide is narrowed to accommodate the at least one input waveguide end face closely adjacent the input point without interfering with the diverging wavefront.

17. An arrayed waveguide grating as defined in claim 15, wherein the at least one integrated input waveguide comprises a plurality of integrated input waveguides.

18. An arrayed waveguide grating as defined in claim 17, wherein the plurality of input waveguides each have an end portion having an increasing tapered width.

19. An arrayed waveguide grating as defined in claim 18, wherein the plurality of input waveguides include planar waveguide portions of different lengths between the input waveguide ends and the lens means.

20. An arrayed waveguide grating as defined in claim 17, wherein the plurality of input waveguides have among them at least one varying coupling parameter selected from the group consisting of: input position, waveguide taper, and planar waveguide length increment.

21. An arrayed waveguide grating as defined in claim 11, wherein the reflective element is supported by a thermally actuated tilt mechanism for coupling reflected light to the lens means at an angle to impart an offset to the focused light at the input point in response to temperature.

* * * * *

UNITED STATES PATENT AND TRADEMARK OFFICE
CERTIFICATE OF CORRECTION

PATENT NO. : 6,701,043 B2
DATED : March 2, 2004
INVENTOR(S) : Delisle et al.

It is certified that error appears in the above-identified patent and that said Letters Patent is hereby corrected as shown below:

Column 4,
Line 56, "removes the OX" should read -- removes the θX --

Column 8,
Line 52, "Any arrayed waveguide" should read -- An arrayed waveguide --

Signed and Sealed this

Sixth Day of July, 2004

JON W. DUDAS
*Acting Director of the United States Patent and Trademark Office*